(12) United States Patent
Dhall (10) Patent No.: US 9,139,284 B1
(45) Date of Patent: Sep. 22, 2015

(54) TELESCOPIC WING WITH ROTATING STRUCTURAL SPAR

(71) Applicant: Sanjay Dhall, Canton, MI (US)

(72) Inventor: Sanjay Dhall, Canton, MI (US)

(*) Notice: Subject to any disclaimer, the term of this patent is extended or adjusted under 35 U.S.C. 154(b) by 74 days.

(21) Appl. No.: 14/055,272

(22) Filed: Oct. 16, 2013

(51) Int. Cl.
*B64C 3/56* (2006.01)
*B64C 3/18* (2006.01)
*B64C 3/26* (2006.01)

(52) U.S. Cl.
CPC .............. *B64C 3/185* (2013.01); *B64C 3/187* (2013.01); *B64C 3/26* (2013.01); *B64C 3/56* (2013.01)

(58) Field of Classification Search
CPC ..................................... B64C 3/38; B64C 3/56
USPC ..................................... 244/46, 218
See application file for complete search history.

(56) References Cited

U.S. PATENT DOCUMENTS

| | | | |
|---|---|---|---|
| 4,577,815 A | 3/1986 | Orazi | |
| 4,824,053 A | 4/1989 | Sarh | |
| 6,089,503 A * | 7/2000 | Volk | 244/48 |
| 6,834,835 B1 * | 12/2004 | Knowles et al. | 244/198 |
| 7,762,500 B1 | 7/2010 | Dhall | |
| 7,789,343 B2 * | 9/2010 | Sarh et al. | 244/46 |
| 7,866,610 B2 * | 1/2011 | Bousfield | 244/218 |
| 8,371,520 B2 | 2/2013 | Easter | |
| 8,439,314 B1 * | 5/2013 | Dhall | 244/218 |
| 2011/0101172 A1 | 5/2011 | Dyckrup | |

* cited by examiner

*Primary Examiner* — Justin Benedik
(74) *Attorney, Agent, or Firm* — Young Basile Hanlon & MacFarlane P.C.

(57) ABSTRACT

An aircraft wing assembly includes a first wing portion and a structural spar that is disposed within the first wing portion. The structural spar is rotatable between an engaged position, wherein the structural spar engages a first internal structure of the first wing portion to stiffen the first wing portion, and a disengaged position, wherein the structural spar does not engage the first internal structure of the first wing portion.

20 Claims, 8 Drawing Sheets

TELESCOPIC WING WITH ROTATING STRUCTURAL SPAR

BACKGROUND

The wings of fixed-wing aircraft are necessarily large, and their size makes it difficult to move and store a fixed-wing aircraft when it is not in flight. Accordingly, many designs have been previously proposed for reducing the space occupied by aircraft wings when the aircraft is not in flight. These designs have been proposed both for conventional fixed-wing aircraft as well as so-called roadable aircraft. Generally stated, roadable aircraft are aircraft that may be converted for surface travel upon a roadway.

Telescopic wing designs have previously proposed for reducing the space occupied by the wings of an aircraft when it is not in flight. In telescopic wing designs, at least one portion of the wing retracts longitudinally into an adjacent portion of the wing. Because the space that wing portions occupy when retracted cannot be obstructed, structural features that would typically be used to add rigidity to the wing, such as internal stiffening ribs, cannot be provided within this space.

SUMMARY

Telescopic wings having rotating structural spars are taught herein.

One aspect of the disclosed embodiments is an aircraft wing assembly that includes a first wing portion and a structural spar that is disposed within the first wing portion. The structural spar is rotatable between an engaged position, wherein the structural spar engages a first internal structure of the first wing portion to stiffen the first wing portion, and a disengaged position, wherein the structural spar does not engage the first internal structure of the first wing portion.

Another aspect of the disclosed embodiments is an aircraft wing assembly that includes a telescopic wing and a structural spar. The telescopic wing has a first wing portion and a second wing portion, wherein the first wing portion and the second wing portion are telescopically related. The structural spar has a first spar portion and a second spar portion that are telescopically related, wherein the structural spar is connected to the telescopic wing such that the telescopic wing and the structural spar move in unison. The structural spar is rotatable between a disengaged position, in which the telescopic wing and the structural spar are free to move between an extended position and a retracted position, and an engaged position, in which the telescopic wing and the structural spar are disposed in the extended position and are restrained from moving to the retracted position.

BRIEF DESCRIPTION OF THE DRAWINGS

The description herein makes reference to the accompanying drawings wherein like referenced numerals refer to like parts throughout several views and wherein.

DETAILED DESCRIPTION

The description herein relates to wings having rotatable structural spars, and in particular, to telescopic wings having rotatable structural spars, where the telescopic wing is moveable between extended and retracted positions, and the structural spar is rotatable to an engaged position to stiffen the wing during flight of an aircraft. The telescopic wings discussed herein are intended for use as aircraft wings, particularly for fixed-wing aircraft. As will be discussed further herein, a telescopic wing has at least two wing portions that define extended and retracted positions for the telescopic wing. In the retracted position, at least one of the wing portions moves into a space that is defined inside an adjacent wing portion, thereby reducing the overall length of the wing. The telescopic wings discussed herein include one or more structural spars that extend through the wing and are rotatable with respect to the wing about a longitudinal axis of the structural spar. In some implementations, such as the ones shown in the illustrated examples, a telescopic wing includes a single rotatable structural spar. In other implementations, a telescopic wing can include multiple rotatable structural spars. The structural spars discussed herein move between an engaged position and a disengaged position. In the engaged position, the rotating structural spar engages part of the wing, such as the skin of the wing or a support structure for the skin, to provide rigidity to the wing during flight of the aircraft to which the wing is attached. In the disengaged position, the structural spar is rotated, such as by 90° about the longitudinal axis of the structural spar with respect to the engaged position. The structural spar is rotated to allow the wing to be moved from the extended position to the retracted position, as this would not be possible while the structural spar is disposed in the engaged position.

Figure 1:
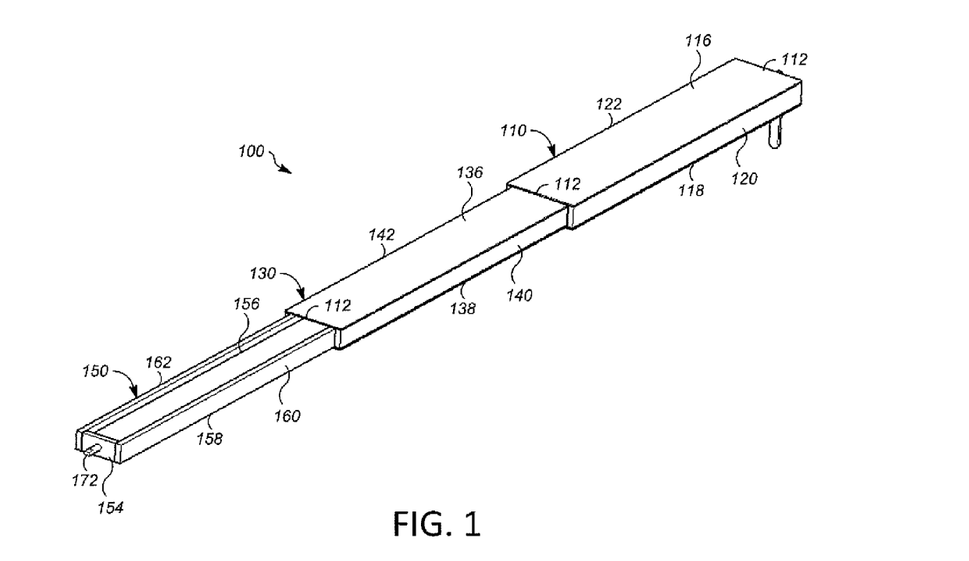
FIG. 1 is a perspective view showing a structural spar in an extended position.
Figure 2:
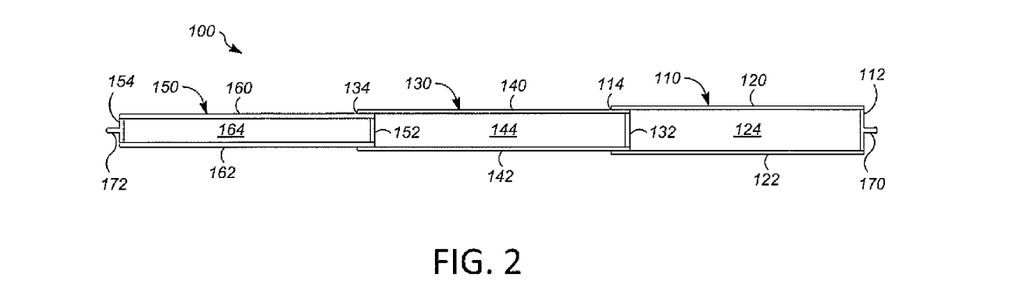
FIG. 2 is a cross-section view showing the structural spar in the extended position.
Figure 3:
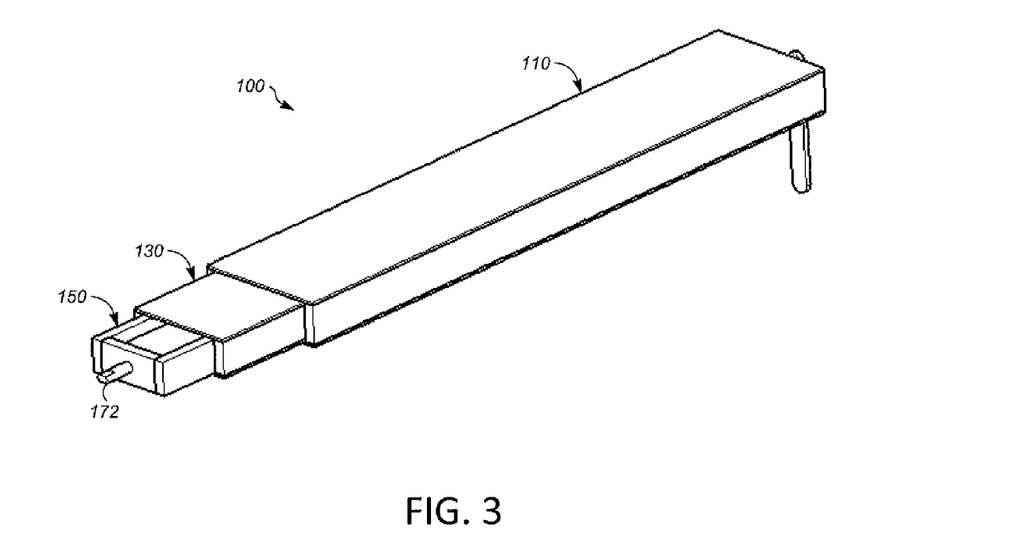
FIG. 3 is a perspective view showing the structural span in a retracted position.

FIGS. 1-3 show a structural spar 100. The structural spar 100 has a plurality of sections or portions that are telescopically related to one another. In the illustrated example, the structural spar includes three telescopically related portions: a first spar portion 110; a second spar portion 130; and a third spar portion 150.

The first spar portion 110 of the structural spar 100 extends from an end panel 112 at a first end thereof to an opening such as an open end 114 at a second end thereof. The longitudinal direction of the first spar portion 110 is defined from the end panel 112 to the open end 114. The first spar portion 110 includes four side walls that each extend from the end panel 112 to the open end 114, namely a first side panel 116, a second side panel 118 that is situated opposite the first side panel 116, a third side panel 120 that extends from the first side panel 116 to the second side panel 118, and a fourth side panel 122 that is situated opposite the third side panel 120 and extends from the first side panel 116 to the second side panel 118. The first side panel 116 and the second side panel 118 have a first width that is greater than a second width of the third side panel 120 and the fourth side panel 122. The first side panel 116 and the second side panel 118 are spaced apart by the second width, while the third side panel 120 and the fourth side panel 122 are spaced apart by the first width. The first side panel 116, the second side panel 118, the third side panel 120 and the fourth side panel 122 are connected to one another in a substantially rectangular configuration that defines a hollow interior space 124 for the first spar portion 110.

The second spar portion 130 is similar in construction to the first spar portion 110. The second spar portion 130 extends from an end panel 132 to an open end or an opening 134. The second spar portion 130 includes a first side panel 136, a second side panel 138, a third side panel 140, and a fourth side panel 142 which are configured and arranged in a similar manner as to the first side panel 116, the second side panel 118, the third side panel 120 and the fourth side panel 122 of the first spar portion 110. The first through fourth side panels 136, 138, 140 and 142 of the second spar portion 130 are configured and arranged to define a substantially rectangular structure for the second spar portion 130 having a hollow interior space 144.

A third spar portion 150 extends from a first end panel 152 to a second end panel 154. The third spar portion 150 is otherwise similar in construction to the first spar portion 110 and the second spar portion 130, including a first side panel 156, a second side panel 158 at third side panel 160 and a fourth side panel 162 that cooperate to define a substantially rectangular structure having a hollow interior 164.

To allow the structural spar 100 to be mounted for rotation, as will be described herein, a first axle member 170 is located on the first spar portion 110 of the structural spar 100 and extends outward from the end panel 112 thereof, and a second axle member 172 is located on the third spar portion 150 of this structural spar 100 and extends outward from the second end panel 154 thereof. The first axle member 170 and the second axle member 172 both extend in the longitudinal direction and are blind with respect to one another on a common axis.

The first spar portion 110, the second spar portion 130 and the third spar portion 150 of the structural spar 100 are telescopically related to one another. The third spar portion 150 is at least partially disposed within the hollow interior space 144 of the second spar portion 130. The second spar portion 130 is at least partially disposed within the hollow interior space 124 of the first spar portion 110. The telescopic relationship of the first spar portion 110, the second spar portion 130, and the third spar portion 150 allows the structural spar 100 to move between an extended position (FIGS. 1-2) and a retracted position (FIG. 3) in the extended position, the structural spar 100 defines a first length. In the retracted position, the structural spar 100 defines a second length that is shorter than a first length.

The structural spar 100 is described herein as having a first spar portion 110, a second spar portion 130, and a third spar portion 150. It should be understood, however, that the structural spar 100 need not include three sections. Instead, a telescoping structural spar can be defined by two or more telescopically related sections, and can include any desired number of sections. In some implementations, the wing assemblies that are described herein can be implemented using a single spar section, and thus have a non-telescoping spar. In addition, although the structural spar 100 is described herein as having a substantially rectangular shape, it should be understood that other shapes can be utilized. Furthermore, the structural spar 100 can be fabricated from multiple pieces by any suitable joining method, or can be formed as a unitary one-piece structural, for example, by extrusion using a material such as aluminum, or by molding using a material such as carbon fiber reinforced plastic.

Figure 4:
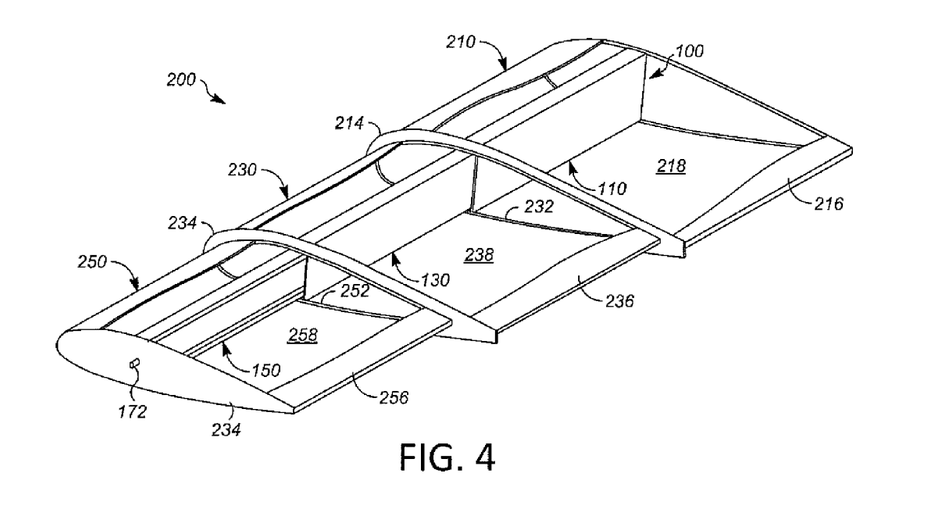
FIG. 4 is a perspective view of a telescopic wing assembly in which a telescopic wing is in an extended position, the structural spar is the extended position, and the structural spar is in an engaged position.

FIG. 4 is a perspective view showing a wing assembly defined by a telescopic wing 200 having a first wing portion 210, a second wing portion 230, and a third wing portion 250 in combination with the structural spar 100. In FIG. 4, the telescopic wing 200 and the structural spar 100 are in an extended position, with the structural spar 100 in an engaged position with respect to the telescopic wing 200, to thereby stiffen the telescopic wing 200. Portions of the scan of the first wing portion 210, the second wing portion 230 and the third wing portion 250 are omitted to show the interior of the telescopic wing 200.

A first wing portion 210, a second wing portion 230, and a third wing portion 250 are similar in construction to one another and are telescopically related to one another. The first wing portion 210 extends from a root panel 212 at a first end thereof to an external cap rib 214 at a second end thereof. An opening is defined through the external cap rib 214, and at least part of the second wing portion 230 is disposed within the opening. The first wing portion 210 includes a scan that defines part of the flight surface of the telescopic wing 200, where the skin is defined by an upper skin panel 216 on the top of the first wing portion 210 and a lower skin panel 218 on the bottom of the first wing portion 210.

The second wing portion 230 extends from an inboard rib 232 at a first end thereof and an outboard rib 234 at a second end thereof, where each of the inboard rib 232 and the outboard rib 234 have an opening defined there through. The second wing portion 230 includes a skin that extends from the inboard rib 232 to the outboard rib 234 and is defined by an upper skin panel 236 and a lower skin panel 238.

The third wing portion 250 extends from an inboard rib 252 to a tip panel 254. An opening is defined through the inboard rib 252. A skin of the third wing portion 250 extends from the inboard rib 252 to the tip panel 254, and is defined by an upper skin panel 256 and a lower skin panel 258.

The telescopic wing is described herein as having a first wing portion 210, a second wing portion 230, and a third wing portion 250. It should be understood, however, that the telescopic wing need not include three sections. Instead, a telescopic wing can be defined by two or more telescopically related wing portions and can include any desired number of sections. In some implementations, the rotating structural spars described herein can be implemented in a non-telescopic wing having a single wing section and a non-telescoping structural spar, wherein the structural spar is movable from the engaged position to the disengaged position to selectively stiffen the wing.

Figure 6:
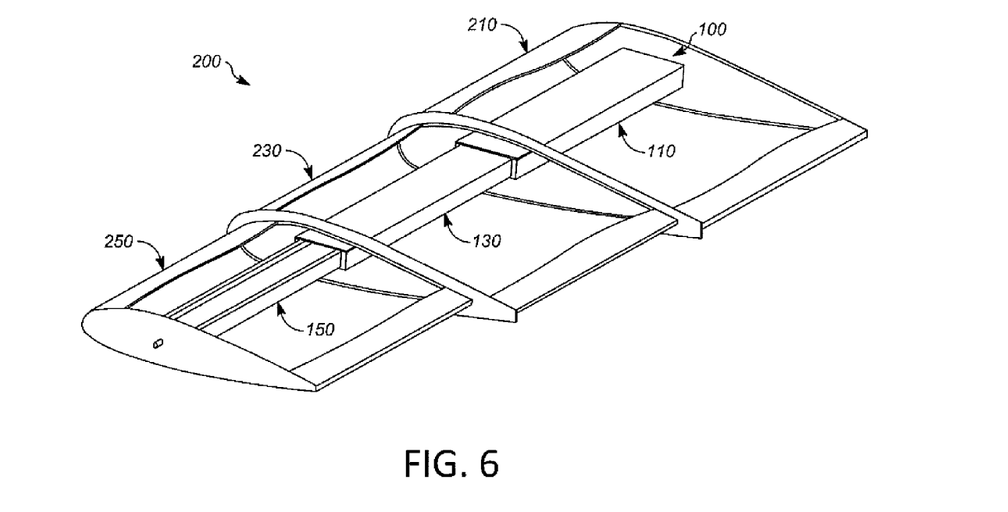
FIG. 6 is a perspective view of the telescopic wing assembly in which the telescopic wing is in the extended position, the structural spar is the extended position, and the structural spar is in a disengaged position.
Figure 7:
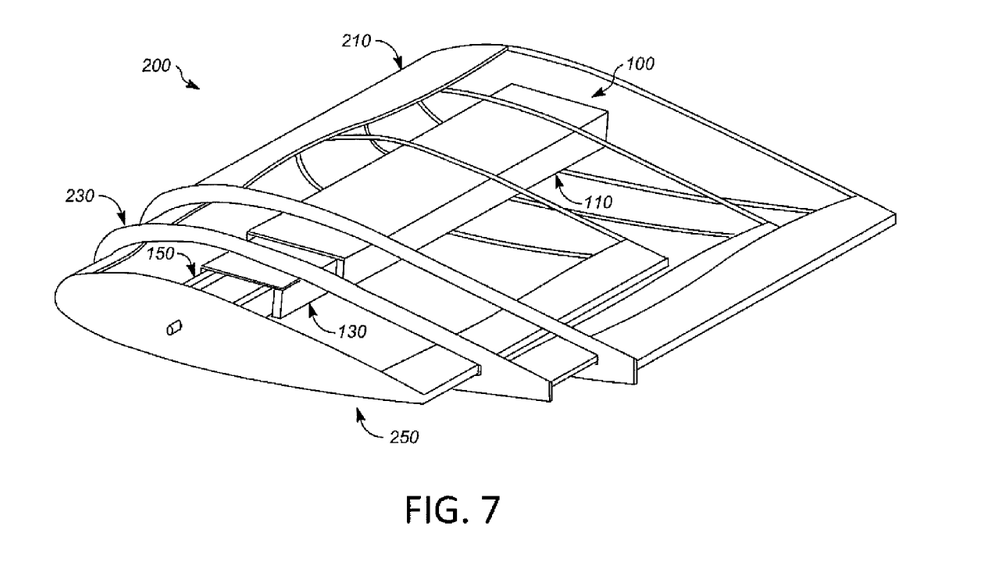
FIG. 7 is a perspective view of the telescopic wing assembly in which the telescopic wing is in the retracted position, the structural spar is the retracted position, and the structural spar is in the disengaged position.

The structural spar 100 extends from the root panel 212 of the first wing portion 210 to the tip panel 254 of the third wing portion 250. The structural spar 100 can be connected to the telescopic wing 200, such as by rotational joints at the root panel 212 and the tip panel 254. In one example, apertures are formed through the root panel 212 and the tip panel 254 for receiving the first axle member 170 and the second axle member 172 of the structural spar 100. In another implementation, hardware such as a bearing is attached to each of the root panel 212 and the tip panel 254 for connecting the first axle member 170 and the second axle member 172 of the structural spar 100 thereto. Thus, the structural spar 100 is connected to the telescopic wing 200 such that the telescopic wing 200 and the structural spar 100 move in unison with respect to one another between an extended position and a retracted position. Furthermore, the structural spar 100 is rotatable with respect to the telescopic wing 200 between an engaged position (FIGS. 4-5) and a disengaged position (FIGS. 6-7).

Figure 5:
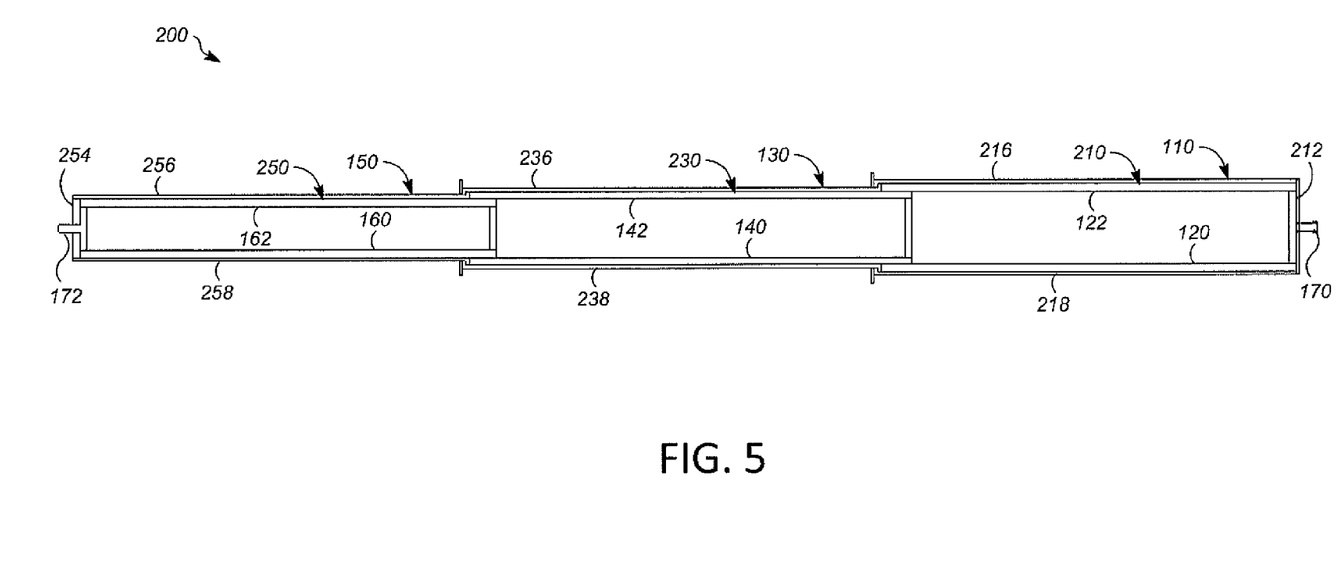
FIG. 5 is a cross-section view of the telescopic wing assembly in which the telescopic wing is in the extended position, the structural spar is the extended position, and the structural spar is in the engaged position.

As best seen in FIG. 5, the structural spar 100 stiffens the telescopic wing 200 when a structural spar 100 is in the engaged position. In particular, the structural spar 100, when in the engaged position, engages an internal structure of the telescopic wing 200 to stiffen the telescopic wing 200. The illustrated example, the structural spar 100 engages interior surfaces of the skin of the telescopic wing 200. In particular, the third side panel 120 and the fourth side panel 122 engage the lower skin panel 218 and the upper skin panel 216 of the first wing portion 210, respectively. The third side panel 140 and the fourth side panel 142 of the second spar portion 130 of the structural spar 100 engage the lower skin panel 238 and the upper skin panel 236, respectively. The third side panel 160 and the fourth side panel 162 of the third spar portion 150 of the structural spar 100 engage the upper skin panel 256 and the lower skin panel 258, respectively, of the third wing portion 250. In another example, the structural spar 100 can engage an internal structure that is connected to the skin of the telescopic wing 200. In another example, the structural spar 100 can engage an internal rib that is connected to the skin of the telescopic wing 200. In another example, the structural spar 100 can engage one or more spacers that are attached to internal surfaces of the skin of the telescopic wing 200. Other types of engagement between the structural spar 100 and the portions of the telescopic wing 200 are possible, in which the structural spar stiffens the telescopic wing 200 while in the engaged position.

While the structural spar 100 is in the engaged position, the telescopic wing 200 is restrained from moving from the extended position toward the retracted position. For example, as best seen in FIG. 5, mechanical interference between the second wing portion 230 and the first spar portion 110 of the structural spar 100 prevents movement of the second wing portion 230 into the first wing portion 210, and thus toward the retracted position, when the structural spar 100 is in the engaged position. While the telescopic wing 200 and the structural spar 100 are in the extended position, the structural spar 100 can be rotated, such as by 90 degrees along its longitudinal axis, to the disengaged position, as shown in FIG. 6. While the structural spar 100 is in the disengaged position, it does not restrain motion of the telescopic wing 200 and the structural spar 100 to move from the extended position toward the retracted position. Thus, the telescopic wing 200 and the structural spar 100 can be moved from the extended position toward the retracted position, as shown in FIG. 7.

Figure 8:
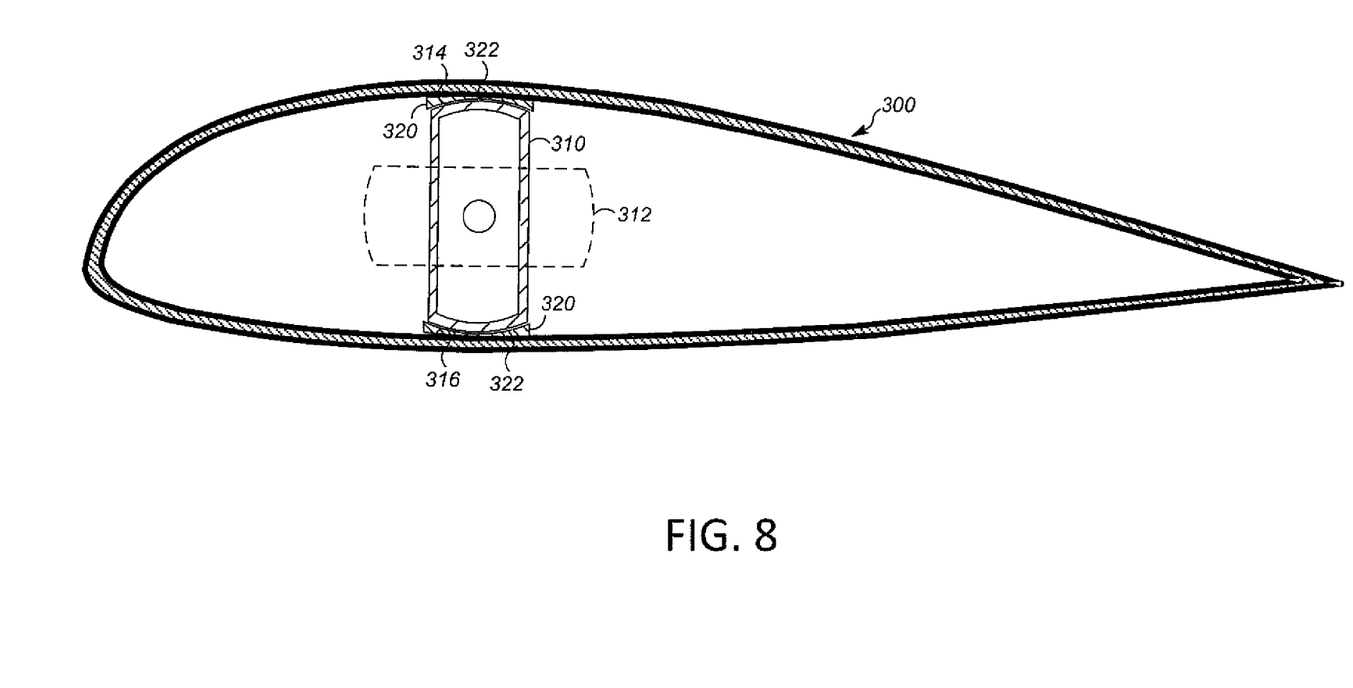
FIG. 8 is a cross-section view of a telescopic wing portion showing spacers for engaging a structural spar according to a first alternative implementation.

FIG. 8 is a cross-section view of a telescopic wing portion 300 according to a first alternative implementation. The telescopic wing portion 300 can be incorporated in a telescopic wing, such as the telescopic wing 200. A structural spar 310 is depicted in an engaged position and is rotatable to a disengaged position 312. An upper spacer 320 and a lower spacer 330 are provided on interior surfaces of the telescopic wing portion 300. The upper spacer 320 and the lower spacer 330 can each be substantially rigid bodies that are connected to the interior surfaces of the telescopic wing portion 300 such that they do not move with respect to the telescopic wing portion 300. The upper spacer 320 and the lower spacer 330 include respective contoured surfaces 322, 332. The contoured surfaces 322, 332 of the spacers 320, 330 are engageable with respective contoured surfaces 314, 316, which are formed on the structural spar 310, when the structural spar 310 is in the engaged position. The contoured surfaces 314, 316, 322, 332 can have the shape of circular arcs, with the contoured surfaces 314, 316 of the structural spar being convex and the contoured surfaces 322, 332 of the spacers 320, 330 being concave, to permit smooth rotation of the structural spar 310 with respect to the spacers 320, 330.

Figure 9:
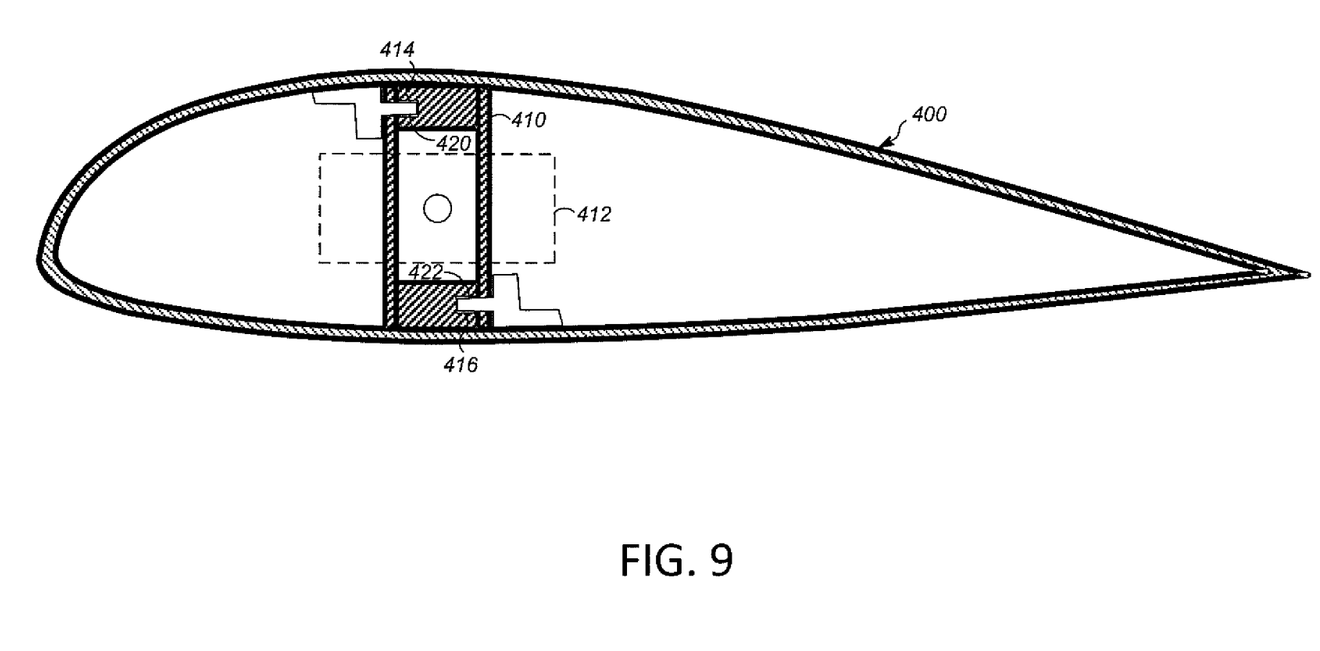
FIG. 9 is a cross-section view of a telescopic wing portion showing internal pins for securing a structural spar according to a second alternative implementation.

FIG. 9 is a cross-section view of a telescopic wing portion 400 according to a second alternative implementation. The telescopic wing portion 400 can be incorporated in a telescopic wing, such as the telescopic wing 200. A structural spar 410 is depicted in an engaged position and is movable to a disengaged position 412. Pins 420, 422 are located within the interior of the telescopic wing portion 400. The pins 420, 422 can be connected to the telescopic wing portion 400 in a fixed position. For example, the pins 420, 422 can be connected to an internal structure of the telescopic wing portion 400, such as a structural member, a stiffening rib, or a stop surface that prevents over-rotation of the structural spar 410. The pins 420, 422 are receivable within apertures 414, 416 that are formed in the structural spar 410. Engagement of the pins 420, 422 with the structural spar 410 restrains the structural spar 410 from moving from the engaged position toward the disengaged position. In one implementation, the pins 420, 422 can be inserted manually, such as being accessed by hand holes (not shown) that are formed through the telescopic wing portion 400. In other implementations, the pins 420, 422 can be deployed by electromechanical actuators, such as solenoids (not shown).

Figure 10:
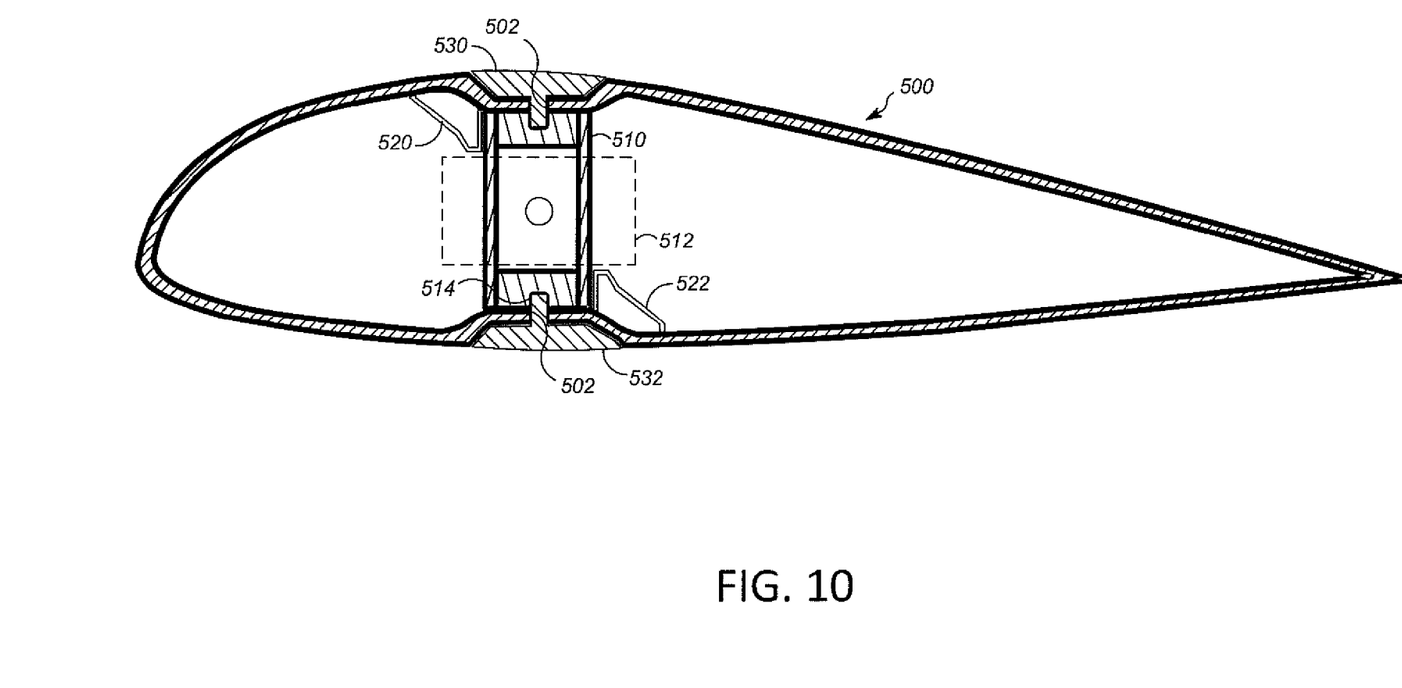
FIG. 10 is a cross-section view of a telescopic wing portion showing pins for securing a structural spar according to a third alternative implementation.

FIG. 10 is a cross-section view of a telescopic wing portion 500 according to a third alternative implementation. The telescopic wing portion 500 can be incorporated in a telescopic wing, such as the telescopic wing 200. A structural spar 510 is depicted in an engaged position and is rotatable to a disengaged position 512. Stop blocks 520, 522 are provided on the interior of the telescopic wing portion 500 in a fixed position with respect to the telescopic wing portion 500 and are engageable with the structural spar 510. In particular, each of the stop blocks 520, 522 has a first surface that is engageable with the structural spar 510 to restrain the structural spar 510 against rotating in a first direction when the structural spar 510 is in an engaged position. In addition, the stop blocks 520, 522 can each include a second surface that is engageable with the structural spar 510 to restrain rotation of the structural spar 510 in a second rotational direction when the structural spar 510 is in the disengaged position. With respect to FIG. 10, the first direction is rotation in a counterclockwise direction, and the second direction is rotation in a clockwise direction. Thus, the stop blocks 520, 522 help align the structural spar 510 in the engaged position and disengaged position, as well as preventing over heightened rotation of the structural spar 510. In order to restrain motion of the structural spar 510 in both directions when the structural spar 510 is in the engaged position, pins 530, 532 are positioned at least partially at the exterior of the telescopic wing portion 500, but extend through first apertures 502 that extend through the telescopic wing portion 500 and second apertures 514 that extend into the structural spar 510. The pins 530, 532 are movable, such as manually, between engaged and disengaged positions with respect to the structural spar 510 to selectively lock the structural spar 510 in the engaged position.

Figure 11:
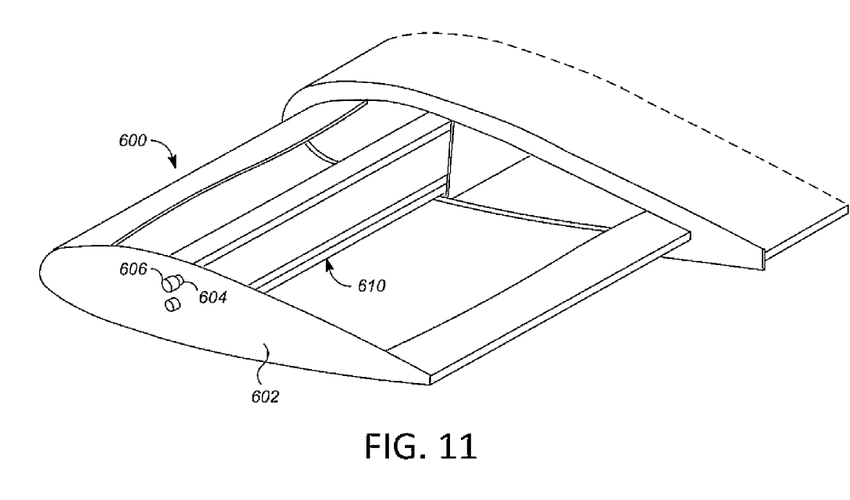
FIG. 11 is a perspective view of a telescopic wing portion showing a pin for securing a structural spar according to a fourth alternative implementation.

FIG. 11 is a cross-section view of a telescopic wing portion 600 according to a fourth alternative implementation. The telescopic wing portion 600 can be incorporated in a telescopic wing, such as the telescopic wing 200. The telescopic wing portion 600 includes a tip panel 602 having an aperture 604 formed therein. A pin 606 is movable between lock and unlock positions with respect to the tip panel 602 and a structural spar 610 for selectively locking and unlocking the structural spar 610 in an engaged position thereof. The pin 606 is received in a complimentary aperture (not shown) that is formed in the structural spar 610. In one example, the lock position of the pin 606 corresponds to pin being disposed within the aperture 604 and the tip panel 602 and the aperture in the structural spar 610, while the unlock position corresponds to the pin 606 being completely removed from the tip panel 602 and the structural spar 610. In another implementation, the pin 606 can be permanently attached to the tip panel 602 and retractable from the aperture in the structural spar 610 by a spring loaded connection.

In operation, the telescopic wings discussed herein can be incorporated in aircraft, such as a fixed wing airplane. The wings can be placed in a retracted position when the airplane will not be flown. While the telescopic wing is in the retracted position, the structural spar is also in the retracted position and is in its disengaged position with respect to the internal structures of the telescopic wing, such as the interior of the skin of the telescopic wing. When use of the telescopic wing is required, the telescopic wing and the structural spar are moved in unison from the retracted position toward the extended position. Once the extended position has been reached, the structural spar can be moved from the disengaged position to the engaged position to thereby stiffen the telescopic wing. In the engaged position, a locking mechanism can be utilized to prevent movement of the structural spar toward the disengaged position, as described in connection with FIGS. 9-11.

While the description relates to what are presently considered to be the most practical and preferred embodiments, it is to be understood various modifications or equivalent arrangements are included within the spirit and scope of the appended claims. The scope is to be accorded the broadest interpretation so as to encompass all such modifications and equivalent structures as is permitted under the law.

What is claimed is:

1. An aircraft wing assembly, comprising:
a first wing portion;
a tip panel that is fixed to the first wing portion; and
a structural spar that is disposed within the first wing portion and is connected to the tip panel by a rotational joint, wherein the structural spar is rotatable with respect to the first wing portion and the tip panel between an engaged position, wherein the structural spar engages a first internal structure of the first wing portion to stiffen the first wing portion, and a disengaged position, wherein the structural spar does not engage the first internal structure of the first wing portion.

2. The aircraft wing assembly of claim 1, further comprising:
a second wing portion, wherein the first wing portion and the second wing portion are telescopically related.

3. The aircraft wing assembly of claim 2, wherein the first wing portion and the second wing portion cooperate to define a telescopic wing having an extended position and a retracted position.

4. The aircraft wing assembly of claim 3, wherein the structural spar is restrained from moving from the disengaged position to the engaged position when the telescopic wing is in the retracted position.

5. The aircraft wing assembly of claim 3, wherein the structural spar includes a first spar portion and a second spar portion that are telescopically related.

6. The aircraft wing assembly of claim 1, wherein the structural spar has a first surface and a second surface that are spaced apart by a first distance, and the structural spar has a third surface and a fourth surface that are spaced apart by a second distance that is less than the first distance, wherein the first surface of the structural spar engages the first internal structure of the first wing portion when the structural spar is in the engaged position.

7. The aircraft wing assembly of claim 6, wherein the second surface of the structural spar engages a second internal structure of the first wing portion when the structural spar is in the engaged position.

8. The aircraft wing assembly of claim 1, wherein the first internal structure is a skin of the first wing portion.

9. The aircraft wing assembly of claim 1, wherein the first internal structure is connected to a skin of the first wing portion.

10. The aircraft wing assembly of claim 1, wherein the first internal structure is an internal rib that is connected to a skin of the first wing portion.

11. The aircraft wing assembly of claim 1, wherein the first internal structure is a spacer that is connected to a skin of the first wing portion.

12. The aircraft wing assembly of claim 1, wherein the structural spar includes a first contoured surface and the first internal structure includes a second contoured surface that is in engagement with the first contoured surface when the structural spar is in the engaged position.

13. The aircraft wing assembly of claim 1, wherein the structural spar is in engagement with a stop surface on an interior of the first wing portion when the structural spar is in the engaged position, and the stop surface restrains rotation of the structural spar in at least a first rotational direction.

14. The aircraft wing assembly of claim 1, further comprising:
a locking member that is engageable with the first wing portion and the structural spar when the structural spar is in the engaged position to restrain the structural spar against moving to the disengaged position.

15. The aircraft wing assembly of claim 14, wherein the locking member is a pin that is receivable within an aperture in the structural spar.

16. An aircraft wing assembly, comprising:
a telescopic wing having a first wing portion and a second wing portion, wherein the first wing portion and the second wing portion are telescopically related; and
a structural spar having a first spar portion and a second spar portion that are telescopically related, wherein the structural spar is connected to the telescopic wing such that the telescopic wing and the structural spar move in unison, wherein the structural spar is rotatable between a disengaged position, in which the telescopic wing and the structural spar are free to move between an extended position and a retracted position, and an engaged position, in which the telescopic wing and the structural spar are disposed in the extended position and are restrained from moving to the retracted position.

17. The aircraft wing assembly of claim 16, wherein the structural spar stiffens a skin of the telescopic wing when the structural spar is in the engaged position.

18. The aircraft wing assembly of claim 16, wherein the structural spar engages a first internal structure of the telescopic wing to stiffen the telescopic wing when the structural spar is in the engaged position.

19. The aircraft wing assembly of claim 18, wherein the first internal structure includes at least one of a skin of the first wing portion, an internal rib that is connected to the skin of the first wing portion, or a spacer that is connected to the skin of the first wing portion.

20. The aircraft wing assembly of claim 16, further comprising:
   a locking member that is engageable with the telescopic wing and the structural spar when the structural spar is in the engaged position to restrain the structural spar against moving to the disengaged position.

\* \* \* \* \*